United States Patent [19]

Fortenberry

[11] Patent Number: 4,527,935
[45] Date of Patent: Jul. 9, 1985

[54] ROUND HAY TRANSPORTER

[76] Inventor: Durrel W. Fortenberry, Rte. 2, Box 135, Lockney, Tex. 79241

[21] Appl. No.: 513,693

[22] Filed: Jul. 14, 1983

[51] Int. Cl.³ .............................................. B60P 1/04
[52] U.S. Cl. ............................... 414/24.5; 280/415 R; 280/511; 414/685; 414/786; 414/912; 414/684
[58] Field of Search ...................... 414/24.5, 24.6, 482, 414/485, 911, 912, 920, 786, 685, 684; 280/415 R, 511; 298/5

[56] References Cited

U.S. PATENT DOCUMENTS

| 2,520,458 | 8/1950 | Doherty | 414/24.5 X |
| 3,659,876 | 5/1972 | Melton | 280/511 |
| 3,877,595 | 4/1975 | Edelman | 414/485 X |
| 3,944,095 | 3/1976 | Brown | 414/485 X |
| 4,015,739 | 4/1977 | Cox | 414/911 X |
| 4,023,693 | 5/1977 | Priefert | 414/24.5 |
| 4,044,907 | 8/1977 | Craft | 414/911 X |
| 4,179,034 | 12/1979 | Van Antwerp et al. | 414/551 |
| 4,348,143 | 9/1982 | Hedqespeth | 414/24.5 |
| 4,428,596 | 1/1984 | Bell et al. | 280/511 X |

FOREIGN PATENT DOCUMENTS 1063979  10/1979  Canada ............................. 414/24.5

OTHER PUBLICATIONS

DewEze Manufacturing, Inc.'s "Big Bale Movers" brochure, Jun. 25, 1979, 5 pages.

Primary Examiner—Robert J. Spar
Assistant Examiner—Ken Muncy
Attorney, Agent, or Firm—Wendell Coffee; Montgomery W. Smith

[57] ABSTRACT

A hay carrier includes two long bale engaging fingers extending from a flat base. The base is pivoted to a crossbar of a subframe. The subframe is transferrable between the bed of a pickup, and a trailer towed by a pickup or other towing vehicle. A winch on a winch bar of the subframe pivots a bale speared by the fingers up or down by reeling or unreeling a cable connected to the hay carrier. The crossbar rests on the trailer axle or rear edge of the pickup bed. The winch bar is removably fastened to a trailer reach pole or pickup bed. The winch is preferably connectable for "in-the-cab" control, through a dashboard-mounted switch, to 12-volt power on the pickup and towing vehicle. The fingers engage the bale near the ground, and support most of the bale from below.

8 Claims, 7 Drawing Figures

ROUND HAY TRANSPORTER

BACKGROUND OF THE INVENTION (1) Field of the Invention

This invention relates to equipment for hauling large round hay bales.

(2) Description of the Prior Art

Large round hay bales provide substantial savings in costs over small rectangular bales where hay is used in substantial quantities. However, the bulk and weight of such bales (4×4×8 feet and 1400–2000 pounds) present unusual hauling problems.

Before filing this application, a search was conducted in the U.S. Patent and Trademark Office. That search revealed the following U.S. patents:

| | |
|---|---|
| COX | 4,015,739 |
| PREIFERT | 4,023,693 |
| PREIFERT | 4,062,454 |
| GOODVIN | 4,084,708 |
| SCHWIEN | 4,095,706 |
| VAN ANTWERP | 4,179,034 |
| LYNCH | 4,288,191 |
| LOVE | 4,297,065 |

COX, particularly in FIGS. 6 and 7, shows the round bale lift to lift the bale into the back of a pickup. The bale engagement portion may be removed and used with a three-point hitch as seen in FIG. 10.

PREIFERT '693 discloses a trailer arrangement for normal use hitched to a pickup, but where the bale engaging portion can be attached to a three-point hitch.

VAN ANTWERP ET AL shows a bale lift using an electric winch in the back of a pickup.

GOODVIN in FIG. 1 shows an electric winch to lift a bale into the back of a pickup.

LYNCH shows an electric winch to lift a bale into the back of a pickup.

SCHWIEN ET AL discloses an electric winch on a trailer.

The other two patents are deemed pertinent because the applicant believes the Examiner would regard anything disclosed by the search to be relevant and pertinent to the examination of this application.

SUMMARY OF THE INVENTION

New and Different Function

I have obtained the unusual and suprising results of a round bale hauler that may be flexibly used on and transferred between a trailer and a pickup with my novel combination of bars, arms, beams, and the like.

My invention includes a base with engaging fingers extending therefrom pivoted to a subframe. A winch on the subframe pivots a bale engaged by the fingers with a cable connected to the base. The subframe is easily detached from or fastened to the trailer (by removal of a single pin for the preferred embodiment), and may be fastened in the bed of a pickup or other similar flat bed vehicle for use there. The base could also be disconnected from the subframe and installed on the three point hitch of a tractor for operation with the hydraulic system thereof, thereby providing a three-in-one, extremely versatile, round hay bale handling system.

Thus, the function of the total combination far exceeds the sum of the functions of the individual elements, such as beams, bars, arms, cables, pins, etc.

Objects of this Invention

An object of this invention is to haul large round hay bales.

Further objects are to achieve the above with a device that is sturdy, compact, durable, lightweight, simple, safe, efficient, versatile, ecologically compatible, energy conserving and reliable, yet inexpensive and easy to manufacture, install, transfer, operate and maintain.

Other objects are to achieve the above with a method that is versatile, ecologically compatible, energy conserving, rapid, efficient, and inexpensive, and does not require skilled people to install, transfer, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Figure 1:
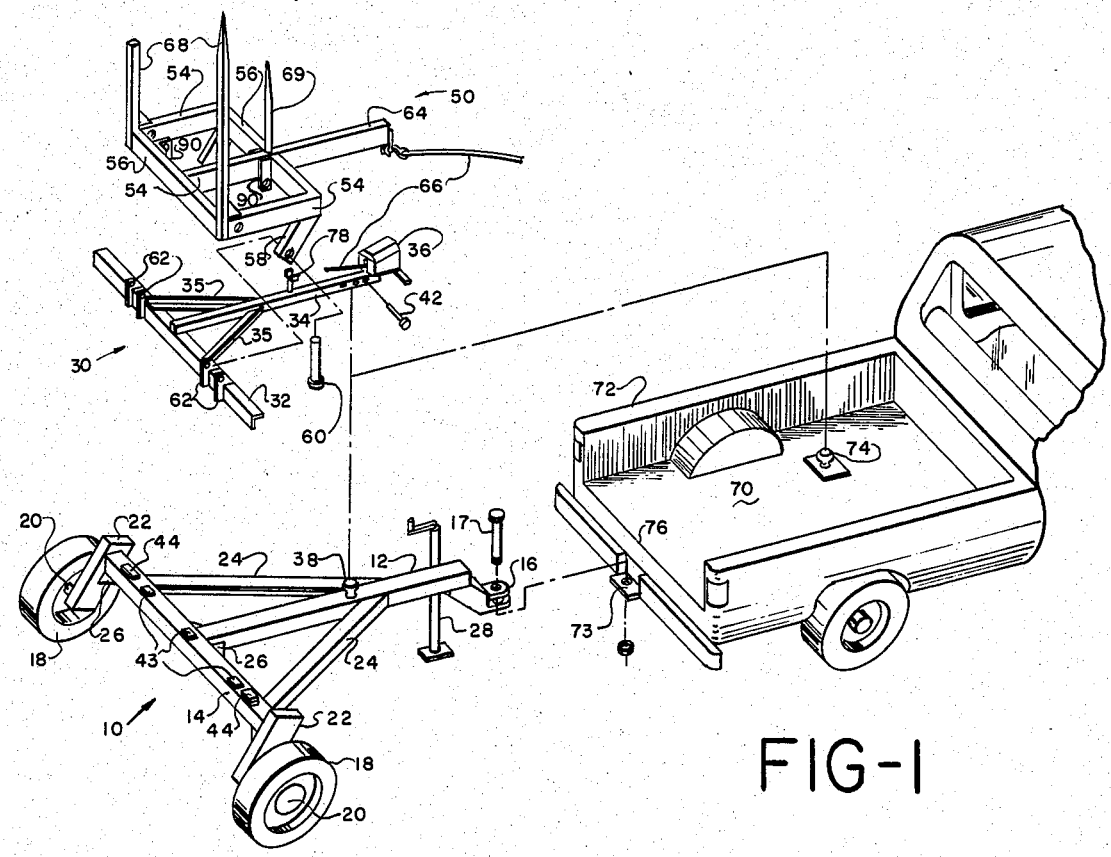
FIG. 1 is a perspective view of a subframe, with hay carrier, according to my invention, shown connectable to a trailer or a pickup bed.

Referring to FIG. 1, the preferred embodiment of my invention for handling round hay bales broadly includes trailer 10, subframe 30 removeably secured on the trailer 10, and hay carrier 50 pivoted to the subframe 30. The subframe 30 may be removed from the trailer 10 and placed in pickup bed 70 of pickup 72 for use therein. Similarly, the hay carrier 50 may be disconnected from the subframe 30 and connected to the three-point hitch of a tractor for operation of the hay carrier with the hydraulics thereof, much like the elongated finger support member disclosed by COX, U.S. Pat. No. 4,015,739.

The trailer 10 has reach pole 12 welded about mediate and normal to axle 14. The reach pole 12 extends forward from the axle 14 and has hitch 16 on a front of the reach pole. Hitch pin 17 extends through holes in the hitch 16 and the hitch point of a vehicle, such as bumper 73 of the pickup 72, as shown in FIG. 1. Two ground engaging wheels 18 are journaled to spindles 20. The spindles 20 are welded to arms 22. The arms 22 are welded to ends of the axle 14 such that the axle 14 is between the spindles 20 and the hitch 16. In other words the spindles 20 are rearward of the axle 14.

Reach braces 24 extend from the ends of the axle 14 to about two-thirds the length of the reach pole 12 forward of the axle 14. Angle plates 26 are welded at the connections of the reach pole 12 to the axle 14 and the arms 22 to the axle 14. The reach braces 24 and the angle plates 26 add strength and rigidity to the trailer 10. Stand 28 connected to the reach pole proximate the hitch 16 completes the basic equipment for the trailer 10.

It will be understood that the hitch 16 may be in any form adapted to permit towing of the trailer 10 by a vehicle, such as the pickup 72 or other vehicle. For normal use, I prefer the simple "pin-in-holes" hitch 16 shown FIG. 1. I prefer to construct the reach pole 12 and axle 14 of square tube steel. The reach braces 24 are preferably made of angle steel, and the angle braces of steel plate.

The subframe 30 has crossbar 32 parallel to and resting on the axle 14. The crossbar 32 is preferrably constructed of angle steel, with the crossbar 32 contacting the axle 14 along its top horizontal and rear vertical surfaces. Winch bar 34, preferably constructed of square tubing as clearly shown in FIGS. 5 and 6, extends forward normal to the crossbar along the reach pole 12 to a point along the reach pole proximate the connection of the reach braces 24 thereto. One end of the winch bar 34 is welded on top of and about mediate of the crossbar 32. A forward end of the winch bar opposite the crossbar has winch 36 connected thereto. Cross braces 35, preferably angle steel, extend from the crossbar 32 to the winch bar 34, and increase the strength and rigidity of the subframe 30.

Fastener means interconnect the reach pole and the winch bar, preferably at the forward end of the winch bar, for releasably fastening the two together. The fastener means is preferably in the form of trailer ball 38 connected to the reach pole 12 below the winch bar 34, and telescoped into a keyhole-shaped slot 40 in the underside of the winch bar 34.

The key hole shaped slot 40 has a large width that is greater than a diameter of the trailer ball and a small width that is less than the ball diameter. Fastener pin 42 forms securing means on the winch bar for releasably containing the ball within the slot. The pin 42 is inserted through holes in the sides of the winch bar 34 behind the ball 38 to retain the ball within the small width of the slot 40. The ball, slot and pin releasably interconnect the winch bar and the reach pole at the forward end of the winch bar.

I prefer to weld wear plates 43 to the axle 14 to account for wear of the axle by rubbing of the crossbar.

Keepers for retaining the crossbar 32 on the axle 14 are preferably in the form of keeper ears 44 extending over the top of the crossbar 32. The keeper ears 44 are welded to axle 14 at each end of the crossbar 32 and extend only over the top of the crossbar. The ears 44 permit slidable disengagement of the crossbar from the axle. When the subframe 30 is moved rearward, the crossbar 32 slides from between the keeper ears 44 and the axle 14.

The subframe 30 is easily and quickly disconnected from the trailer 10 by simply removing clip 45 from the end of the fastener pin 42, removing the pin 42, moving the winch bar 34 and the crossbar 32 rearward on the trailer 10 until the trailer ball 38 is within the large width of slot 40 and the crossbar is free of the ears 44, and lifting the subframe 30 free of the trailer 10.

After the subframe 30 is removed as described above, it may be installed in the pickup bed 70. Referring specifically to the FIG. 7, the large width of the slot 40 is positioned over pickup ball 74 in the pickup bed 70, the winch bar 34 is lowered onto the pickup ball, and the subframe 30 is moved forward until the crossbar 32 engages bed edge 76, similar to the engagement of the crossbar 32 with the axle 14. The fastener pin 42 is inserted behind the ball 74 to fasten the winch bar 34 to the pickup.

The pickup ball is preferably similar to the trailer ball. However, the balls 38 and 74 must each fit through the large width of the slot 40 and be retained within the small width of the slot. Thus the large width of the slot 40 is greater than the largest of the ball diameters, and the small width of the slot 40 is less than the smallest of the diameters of the balls 38 and 74.

As described above for the trailer, the disconnection of the subframe from the pickup bed is the reverse of the procedure just described for installing the subframe in the pickup bed.

Although the ball-in-slot fastener means and keeper ears 44 just described is the preferred embodiment because of the simple and quick connection and disconnection of the subframe to the trailer or the pickup bed, it will be understood that other fastener means could be employed and still be within the scope of my invention. Although other fastener means can be devised, the fastener means shown specifically in FIG. 6 is an alternative fastener means also providing for quick and easy connection and disconnection.

Figure 7:
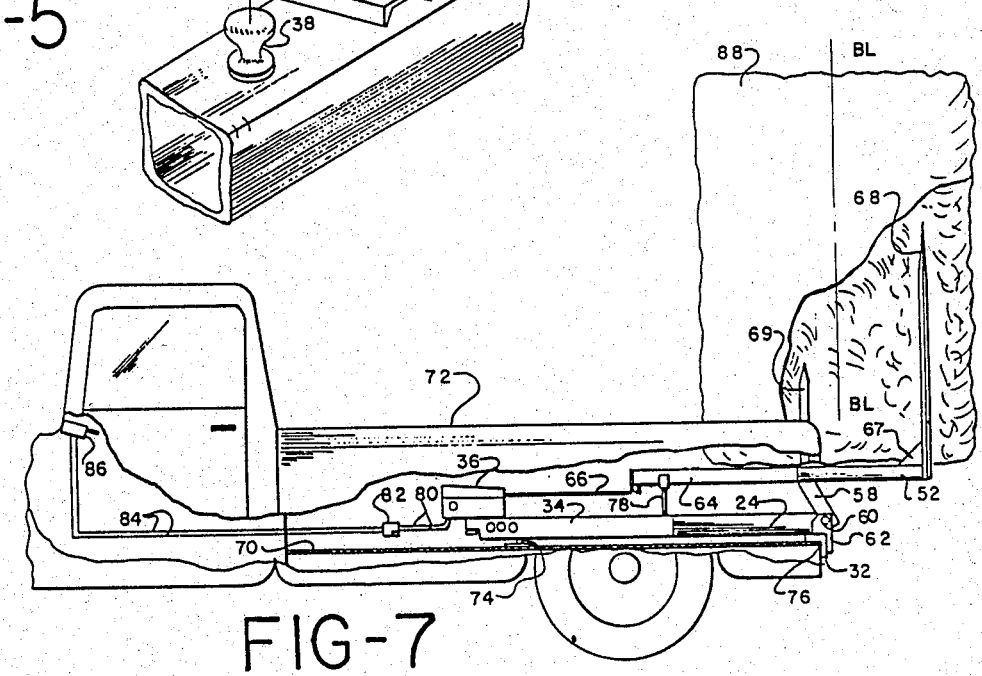
FIG. 7 is a side elevational view of a subframe and hay carrier mounted in a pickup bed with the hay carrier and a bale in the up position and parts broken away to show detail.

Fastener bracket 46 is welded to the forward end of the winch bar 34 parallel to the crossbar 32. When the alternative fastener means is to be used, fastener bar 47 is bolted to the bracket 46. The fastener bar 47 is engaged with fastener ears 48 securely mounted in the bed 70 by positioning the fastener bar 47 in front of the fastener ears 48, and sliding the subframe 30 rearward until the fastener bar 47 is positioned below the ears 48 and the crossbar 32 is positioned on and engaged with the bed edge of the bed 70, substantially the same as shown in FIG. 7 for the engagement of the crossbar 32 with the bed edge 76.

Figure 5:
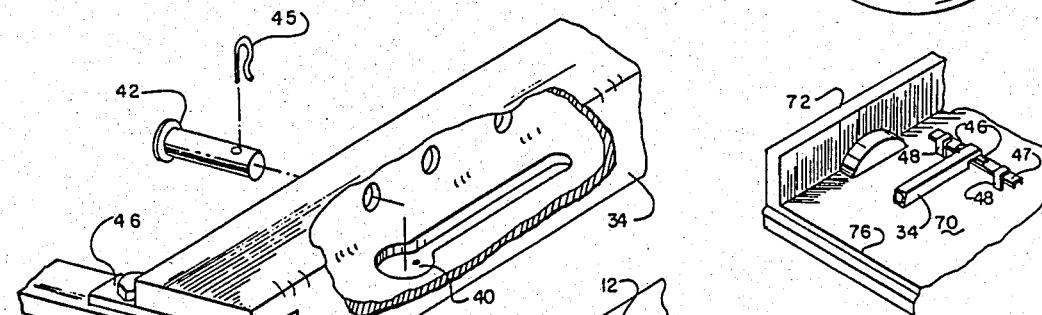
FIG. 5 is a perspective view of the winch bar connection to the reach pole, with parts broken away to show detail.
Figure 6:
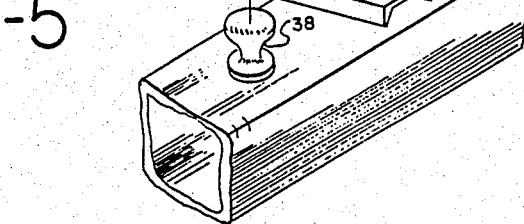
FIG. 6 is a perspective view of an alternate embodiment of a fastener means for securing the subframe to a pickup bed.

It should be apparent that instead of employing a pickup ball as shown in FIG. 1, the fastener means shown in FIG. 5 may be combined with the fastener means shown in FIG. 6 to permit easy interchange of the subframe and hay carrier between the pickup bed and the trailer. Likewise, fastener ears similar to those shown in FIG. 6 could be welded with suitable frame work to the reach pole 12 and the fastener bracket 46 and the fastener bar 47 used in combination therewith to releasably connect the winch bar to the reach pole. Another fastener means could be to simply bolt the fastener bracket 46 or another part of the winch bar directly to the reach pole 12 or a pickup bed, although this fastener means does not have the advantage of quick and easy connection and disconnection.

Figure 3:
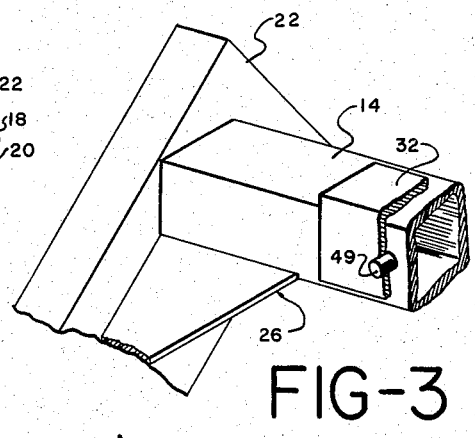
FIG. 3 is a perspective view of an alternate embodiment of a keeper for the crossbar on the axle.

Another form of a keeper is shown in FIG. 3, where keeper studs 49 protruding from the rear of the axle 14 are engaged in holes in the rear of the cross brace 32. It will be apparent that this form of a keeper also engages and disengages incident to slidable movement of the subframe 30 on the trailer 10. The keeper ears 44 are preferred to the keeper studs 49 because the studs are more difficult to align with holes in the back of the crossbar 32 than is the top of the crossbar 32 with the keeper ears.

Because the pickup has a spring suspension, it has not been necessary in practice to place keepers similar to the keeper ears 44 or keeper studs 49 at the bed edge 76 to maintain the crossbar 32 on the bed edge. However, those skilled in the art will be able to easily construct and install such keepers should they be necessary.

The hay carrier 50 has bale base 52, which preferably includes three spaced-apart, parallel posts 54 and two bars 56 connected to the ends of the posts 54 normal thereto. The posts 54 and the bars 56 together form a bale base plane BP. Parallel base arms 58 are rigidly connected to and extend from the bale base 52 at an angle to the base plane. The base arms 58 have holes at the ends thereof distal of bale base 52. Pivot pins 60 are inserted through holes in pivot brackets 62 welded to the crossbar 32 and through the holes in the base arms 58 position and between the pivot bracket 62. The bale base 52, and therefore the hay carrier 50, pivots with respect to the crossbar 32 (the subframe 30). The pivot pins 60 align to form a base axis BA about which the bale base pivots with respect to the crossbar. The base axis BA is parallel to the crossbar 32.

Lift arm 64 is connected at one end to the bale base 52 and extends from the bale base parallel to the base plane. A forward end of the lift arm 64 opposite the bale base 52 is connected by cable 66 to the winch 36. The winch 36 provides means for winding or reeling and unreeling the cable 66 within the winch and thereby moving the forward end of the lift arm 64 toward or away from the winch 36. As the lift arm 64 is thereby moved, the bale base 52 is pivoted about the base axis.

Figure 2:
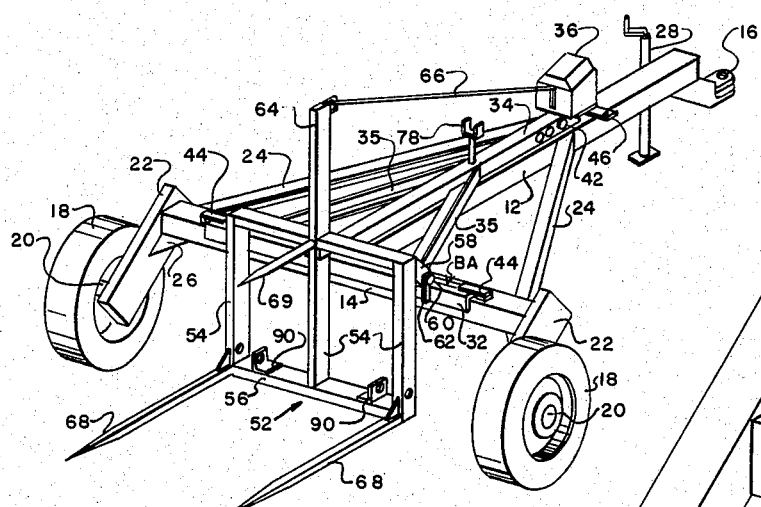
FIG. 2 is a perspective view of a trailer mounted hay hauler according to my invention with the hay carrier in the down position.
Figure 4:
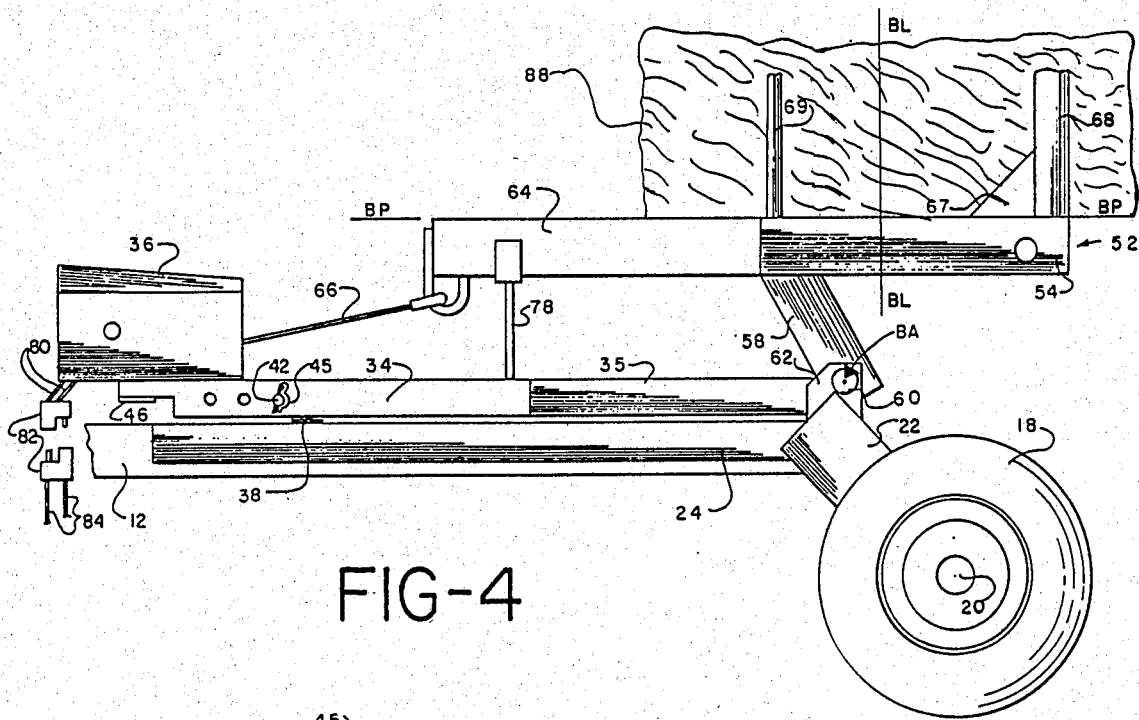
FIG. 4 is a side elevational view of the hay hauler shown in FIG. 2 with a bale on the hay carrier in the up position, with parts broken away to show detail.

Bale engaging fingers are rigidly attached to the bale base 52 and extend therefrom normal to the base plane and opposite the base arms 58. The bale engaging fingers are preferably in the form of long fingers 68 attached to the end of the bale base 52 rearward of the base axis when the base plane is parallel to the winch bar 34, as shown in FIG. 4. In the preferred configuration, when the base plane is in the vertical position shown in FIG. 2, the long fingers 68 extend horizontally from the bottom of the bale base 52. Finger braces 67 extend between the fingers 68 and the outside posts 54 of the bale base 52.

The bales 88, shown in FIGS. 4 and 7, may be either in the form of a cylindrical bale with a diameter of about five feet and a length of five or six feet, or a bale with a four feet square cross-section and a length of about eight feet. Bale axis BL extends substantially along the bale length. Such bales 88 may weigh from 1,200 to more than 2,000 pounds.

The long fingers have a length greater than one half the bale length. The long fingers 68 are spaced apart on the bale base a distance that is greater than one half, yet less than one, bale diameter. This spacing and long finger length significantly facilitates handling of the bale, since the majority of the bale is lifted or supported from below by the fingers, as opposed to the prior art mechanisms that support only half the bale from below with a single centrally impaled finger.

A short finger 69 is preferably attached to the bale base 52 normal to the bale base plane in a position at the top of the base when the fingers are horizontal. The short finger has a length that is less than half the bale length, and aids in stabilizing the bale during transport by preventing shifts of the bale mass along the bale base plane. Of course, although one is preferred, more than one short finger 69 may be employed. The use of the paired long fingers provides increased stability and less chance of bale breakup than with a single finger according to the prior art. As clearly shown in FIGS. 2, 4, and 7, the short finger 69 is positioned on the bale base 52 to impale the bale at about its center, along the bale axis BL. The long fingers 68 are positioned on the bale base 52 to impale the bale substantially below its center along bale axis BL and the short finger 69, inside the bale periphery. This long finger position lifts and supports the majority of the bale from below, as described above.

The winch is preferably connected to a twelve volt D.C. electrical power source on a vehicle towing the trailer, or as illustrated, on the pickup 72 shown in FIG. 7, by winch wires 80, connectors 82, lead wires 84, and cab switch 86, for "in-the-cab" operation of the winch and hay hauler. Of course, if a vehicle other than a pickup 72 is used to tow the trailer, suitable wires and switches for connection of the winch to the vehicle power source would be required. If in the cab operation of the winch is not required, a switch similar to the switch 86 could be mounted on the subframe 30 proximate the winch, and lead wires connected to the vehicle power source at the hitch point or tail lights of the vehicle. In any event, the transfer of the subframe and hay carrier between a pickup and the trailer hitched to another vehicle will also include suitable connection of the winch to a vehicle power source.

Arm rest 78 extends vertically from the winch bar to support the lift arm 64. The arm rest 78 limits the downward travel of the lift arm as the winch 36 reels and unreels the cable 66, and prevents movement of the hay carrier 50 when the winch has snugged the lift arm 64 against the arm rest with the cable.

As shown in FIGS. 4 and 7, the bale axis BL is proximate the base axis BA when the bale axis BL is extended downward from the base plane when the bale axis is substantially vertical. This structural positioning of the bale balances the bale on the subframe to a desired extent, reducing strain and wear of the cable and winch. The center of gravity of the hay carrier is preferably rearward of the base axis BA with or without a hay bale thereon so that the hay carrier pivots downward when the cable is unreeled. The arm rest prevents downward movement of the lift arm that would cause the center of gravity to shift forward of the base axis. Without the arm rest, the bale could suddenly shift forward and injure a person standing next to the trailer.

It will be understood that a keeper or retaining means could be used to releasably connect the lift arm and the arm rest to remove tension on the cable and winch.

To provide additional versatility to the hay hauler of my invention, three-point hitch 90 is preferably welded to the base 52 for connection to the three-point hydraulically controlled hitch of a tractor. The base is disconnected from the subframe 30 by removing the pivot pins 60.

The advantages of my invention may be seen more clearly from a description of the operation thereof. The trailer 10 with the subframe 30 and hay carrier 50 thereon is hitched to a vehicle, which may be the pickup 72 or another vehicle. The winch on the subframe 30 is connected to a 12 volt electrical power supply on the vehicle and the trailer is transported with the vehicle to the location of a round hay bale. The hay carrier 50 is then lowered to a down or load position where the long fingers are parallel to the ground and the base plane is substantially vertical. The hay carrier is lowered by actuation of the winch to reel out the cable, allowing the hay carrier to pivot downward.

With the fingers and hay carrier in the load position, the trailer is backed toward the hay bale, preferably engaging the fingers in the end of the hay bale with the fingers parallel to the bale axis and extending through at least half the length thereof. When the fingers are satisfactorily engaged or speared in the bale, the winch is operated to reel in the cable, thereby pivoting the hay carrier upward. The winch is operated until the lift arm is snugged against the arm rest and the hay bale and hay carrier are in a transport or up position, where the base plane is substantially horizontal. The trailer is then transported with the hay bale thereon by the vehicle to a delivery location. At the delivery location, the winch is operated to unreel the cable and pivot the hay carrier downward until the hay bale is lowered to a surface at the delivery location. It will be understood that when reeling in the cable, the winch is operating in the load direction, and when reeling out the cable, the winch is operating in the unload direction. It will be understood that these nomenclature for describing positions and directions of winching are adopted only for convenience in describing the invention.

When the bale is at rest, the vehicle is driven forward, thereby withdrawing or disengaging the fingers from the bale. The winch is then operated in the load direction to pivot the hay carrier to the transport position. The subframe and hay carrier are then transferrable to a pickup bed for use there. The winch is disconnected from the vehicle power supply. The subframe and hay carrier are disconnected from the trailer. For a subframe 30 connected to the trailer 10 by the ball and hole fastener means, the subframe is removed from the trailer as previously described. For other embodiments fastening the subframe 30 to the trailer 10, the fastener means is disengaged to release the winch bar from the reach pole and any keepers are disengaged to release the crossbar from the axle.

After the subframe is disengaged from the trailer, subframe 30 is placed in the pickup bed and fastened thereto. The fastener means available with which to fasten the winch bar to the pickup bed have been described above. If used with the pickup bed, keepers are also engaged to secure the crossbar to the bed edge. With the subframe and hay carrier therefore mounted in the pickup bed, the pickup is moved to a bale location.

At the bale location, the winch is operated in the unload direction to pivot the hay carrier downward to the load position. The pickup is then backed toward the bale, engaging the bale as described above with the trailer-based subframe and hay carrier. After the bale is satisfactorily engaged, the bale is raised to the transport position by the operation of the winch in the load direction to pivot the hay carrier to the transport position. The pickup is then moved to a delivery location, where the bale is lowered to rest on a surface by the operation of the winch in the unload direction to pivot the hay carrier until it is substantially at the load position. The pickup is then moved forward, disengaging the fingers from the bale. The winch is then operated in the load direction to pivot the hay carrier again to the transport position.

Of course the subframe 30 and hay carrier 50 may again be mounted on the trailer 10 by disconnecting the winch from the pickup electrical power supply, disconnecting the subframe and hay carrier from the pickup bed, placing the subframe and hay carrier on the trailer, and fastening the subframe to the trailer at the winch bar and the crossbar. When in use, the trailer would be hitched to a vehicle, and the winch connected by wires to the vehicle power supply.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10. | trailer | 50. | hay carrier |
|---|---|---|---|
| 12. | reach pole | 52. | bale base |
| 14. | axle | 54. | posts |
| 16. | hitch | 56. | bars |
| 17. | hitch pin | 58. | base arms |
| 18. | wheels | 60. | pivot pins |
| 20. | spindles | 62. | pivot brackets |
| 22. | arms | 64. | lift arm |
| 24. | reach braces | 66. | cable |
| 26. | angle plates | 67. | finger braces |
| 28. | stand | 68. | long fingers |
| 30. | subframe | 69. | short finger |
| 32. | crossbar | 70. | pickup bed |
| 34. | winch bar | 72. | pickup |
| 35. | cross braces | 73. | bumper |
| 36. | winch | 74. | pickup ball |
| 38. | trailer ball | 76. | bed edge |
| 40. | slot | 78. | arm rest |
| 42. | fastener pin | 80. | winch wires |
| 44. | keeper ears | 82. | connectors |
| 45. | clip | 84. | lead wires |
| 46. | fastener bracket | 86. | cab switch |
| 47. | fastener bar | 88. | bale |
| 48. | fastener ears | 90. | 3-point hitch |
| 49. | keeper studs | | |

I claim as my invention:

1. The improved method of hauling large, round hay bales having a bale length and a bale center comprising the steps of:
   a. hitching a trailer with a removable subframe thereon to a towing vehicle,
   b. connecting a winch on a winch bar of the subframe to a 12 volt electrical power supply on the towing vehicle,
   c. reeling in a cable connecting the winch to a hay carrier pivoted at a horizontal base axis to a cross bar of the subframe, thereby
   d. pivoting the hay carrier upward about the base axis to a transport position, with bale engaging fingers longer than half the bale length extending from the hay carrier substantially vertical, and a center of gravity of the hay carrier rearward of the base axis;
   e. hauling a round bale by
   f. transporting the trailer to the location of a round hay bale on ground;
   g. lowering the hay carrier to a load position wherein the bale engaging fingers are substantially horizontal and spaced above the ground substantially below the bale center, by
   h. unreeling the cable with the winch and 3. The invention as defined in claim 2 including all of the limitations a. through ee. with the addition of the following limitation:

ff. at least one of the bale engaging fingers having a length less than half the length and being positioned above the long fingers when the base plane is vertical.

4. The improved machine for handling round hay bales comprising
   a. a trailer having
   b. two ground engaging wheels connected to
   c. an axle,
   d. a reach pole extending forward from and normal to the axle,
   e. a hitch on the front of the reach pole;
   f. said trailer being connectable at the hitch to a towing vehicle;
   g. a subframe having
   h. a cross bar parallel to and resting on the axle,
   i. a winch bar extending forward from the cross bar along the reach pole,
   j. an electrically powered winch on the forward end of the winch bar, and
   k. the winch being connectable by wires to a 12-volt power source on the towing vehicle;
   l. a hay carrier having
   m. a base pivoted to the cross bar by at least two base arms for rotation about a base axis substantially parallel to the cross bar,
   n. the base forming a base plane parallel to and spaced away from the base axis,
   o. bale engaging fingers rigidly attached to the base extending substantially normal to the base plane,
   p. a lift arm extending from the base;
   q. a cable extending from the winch to the lift arm to pivot the hay carrier about the base axis;
   r. a trailer fastener releasably interconnecting the winch bar and the reach pole;
   s. said trailer fastener being engaged by sliding the subframe in one direction on the trailer and disengaged by sliding the subframe in an opposite direction on the trailer,
   t. trailer securing means on the subframe for releasably preventing said slidable movement of the subframe in said opposite direction on the trailer; and
   u. a pickup having
   v. a cargo bed extending to a pickup rear,
   w. an edge of the bed at the pickup rear
   x. said subframe being adapted to rest the cross bar at the bed edge, and rest the winch bar on the bed forward of the bed edge,
   y. a pickup fastener releasably interconnecting the winch bar and the pickup bed,
   z. said pickup fastener being engaged by sliding the subframe in one bed direction on the pickup bed and disengaged by sliding the subframe in an opposite bed direction on the pickup bed,
   aa. pickup securing means on the subframe for releasably preventing slidable movement of the subframe in said opposite bed direction on the pickup bed
   bb. the winch bar being tubular,
   cc. said trailer fastener including
   dd. a ball on the reach pole below the winch bar, having
   ee. a large ball width and
   ff. a small ball width, less than the large ball width, between the large ball width and the reach pole, and
   gg. a keyhole shaped slot in the winch bar opposite the reach pole, having
   hh. a large slot width, larger than the large ball width adapted to receive the ball therethrough and
   ii. a small slot width, smaller than the large ball width, adapted to slidably receive the small ball width;
   jj. said trailer securing means being in the form of a removable pin extended through at least one hole in the winch bar adjacent the ball to prevent sliding of the winch bar in said opposite direction with respect to the ball on the trailer,
   kk. keepers releasably interconnecting the cross bar and the axle,
   ll. said keepers being engaged by sliding the subframe on the trailer in said direction for engaging the trailer fastener and being disengaged by sliding the subframe on the trailer in said opposite direction for disengaging said trailer fastener.

5. The invention as defined in claim 4 including all of the limitations a. through ll. with the addition of the following limitations:

mm. the wheels being journaled to spindles,
nn. trailer arms connecting the spindles to the axle,
oo. the axle and the base axis being forward of the spindles,
pp. an armrest extending from the winch bar, between the lift arm and the winch bar, for limiting upward pivoting of the hay carrier about the base axis to a transport position with the long fingers substantially vertical,
qq. said base arms being attached to said bale base such that a center of gravity of the hay carrier is rearward of the base axis when the hay carrier is in the transport position,
rr. said long fingers being positioned on the bale base so that when said bale is engaged by the long fingers and pivoted upward to the transport position, the resultant center of gravity of the hay carrier with the bale thereon is rearward of the base axis.

6. The invention as defined in claim 4 including all of the limitations a. through ll. with the addition of the following limitations:

mm. the hay bales each having
nn. a bale axis extending through a bale center,
oo. a bale diameter normal to the bale axis, and
pp. a length along the axis;
qq. at least two of the bale engaging fingers extending from the base being long fingers that are
rr. spaced apart on the base a distance greater than one half, and less than, the bale diameter,
ss. of sufficient length to penetrate more than half the bale length into the hay bale, and
tt. positioned on the base so that when the hay carrier is pivoted downward so that the fingers are substantially horizontal, the long fingers are spaced above the ground, substantially below the bale center.

7. The invention as defined in claim 4 including all of the limitations a. through ll. with the addition of the following limitations:

mm. said pickup fastener including
nn. a pickup ball on the pickup bed forward of the bed edge, having
oo. a large pickup ball width larger than the small slot width and smaller than the large slot width, i. pivoting the hay carrier downward about the base axis until the hay carrier is in the load position;
j. backing the trailer with the towing vehicle toward the hay bale,
k. engaging the bale with said fingers wherein the fingers extend at least half the bale length within the bale, substantially below the bale center; and
l. raising the hay bale above the ground to the transport position by
m. reeling in the cable with the winch and
n. pivoting the hay carrier upward about the base axis until it is in the transport position with the center of gravity of the bale and hay carrier rearward of the base axis;
o. transporting the trailer and hay bale to a delivery location,
p. lowering the bale to the ground by
q. unreeling the cable with the winch and
r. pivoting the hay carrier downward about the base axis until it is in the load position,
s. moving the trailer forward with the towing vehicle, and
t. disengaging the fingers from the bale;
u. transferring the subframe with the hay carrier, from the trailer to a pickup by
v. disconnecting the winch from the towing vehicle's electrical power supply,
w. removing securing means on the subframe for preventing slidable movement of the subframe on the trailer,
x. sliding the subframe on the trailer thereby
y. disengaging the winch bar of the subframe slidable engagement with a fastener on the reach pole of the trailer, then
z. lifting the subframe with the hay carrier pivoted thereto from the trailer, then
aa. placing the subframe in a bed of a pickup,
bb. slidably engaging the winch bar with a fastener on the pickup bed by
cc. sliding the subframe on the pickup bed,
dd. engaging securing means on the subframe for preventing slidable movement of the subframe on the pickup bed,
ee. connecting the winch to a 12 volt electrical power supply on the pickup; then
ff. hauling another round bale by
gg. moving the pickup to the location of a bale on the ground,
hh. lowering the hay carrier to a load position with the bale engaging fingers substantially horizontal and spaced above the ground substantially below the bale center by
ii. unreeling the cable with the winch and
jj. pivoting the hay carrier downward about the base axis until the hay carrier is in the load position,
kk. backing the pickup toward the bale,
ll. engaging the bale with said fingers wherein the fingers extend at least half the bale length within the bale, substantially below the bale center; and
mm. raising the bale to the transport position with said fingers substantially vertical and a center of gravity of the hay carrier and bale rearward of the base axis, by
nn. reeling in the cable with the winch and
oo. pivoting the hay carrier upward about the base axis until the hay carrier is substantially in the transport position;
pp. moving the pickup to a delivery location,
qq. lowering the bale to the ground by
rr. unreeling the cable with the winch and
ss. pivoting the hay carrier downward about the base axis until it is in the load position,
tt. moving the pickup forward and
uu. disengaging the fingers from the bale.

2. The improved machine for handling round hay bales comprising
   a. a trailer having
   b. two ground engaging wheels connected to
   c. an axle,
   d. a reach pole extending forward from and normal to the towing axle,
   e. a hitch on the front of the reach pole;
   f. said trailer being connectable at the hitch to a towing vehicle;
   g. a subframe having
   h. a cross bar parallel to and resting on the axle,
   i. a winch bar extending forward from the cross bar along the reach pole,
   j. an electrically powered winch on the forward end of the winch bar, and
   k. the winch being connectable by wires to a 12-volt power source on the towing vehicle;
   l. a hay carrier having
   m. a base pivoted to the cross bar by at least two base arms for rotation about a base axis substantially parallel to the cross bar,
   n. the base forming a base plane parallel to and spaced away from the base axis,
   o. bale engaging fingers rigidly attached to the base extending transverse of the base plane and pivotable between a substantially vertical and substantially horizontal position,
   p. a lift arm extending from the base;
   q. a cable extending from the winch to the lift arm to pivot the hay carrier about the base axis;
   r. a trailer fastener for releasably interconnecting the winch bar and the reach pole;
   s. a pickup having
   t. a cargo bed extending to a pickup rear,
   u. an edge of the bed at the pickup rear
   v. said subframe being adapted to rest the cross bar at the bed edge, and rest the winch bar on the bed forward of the bed edge,
   w. a pickup fastener for releasably interconnecting the winch bar and the pickup bed;
   x. the hay bales each having
   y. a bale axis extending through a bale center,
   z. a diameter normal to the bale axis, and
   aa. a length along the bale axis;
   bb. at least two of the bale engaging fingers extending from the base being long fingers that are
   cc. spaced apart on the base a distance greater than one half, and less than, the bale diameter,
   dd. of sufficient length to penetrate more than half the bale length into the hay bale, and
   ee. positioned on the base so that when the hay carrier is pivoted downward about the base axis so that the fingers are substantially horizontal, the long fingers are spaced above the ground, substantially below the bale center and positioned on the base so that when the hay carrier is pivoted upward about the base axis so that the fingers are substantially vertical, the center of gravity of the hay carrier and bale is rearward of the base axis.

pp. a small pickup ball width, smaller than the small slot width, between the large pickup ball width and the pickup bed,
qq. said pin extended through said hole in the winch bar also forming said pickup securing means.

8. The invention as defined in claim 4 including all of the limitations a. through ll. with the addition of the following limitations:
mm. said pickup fastener including
nn. a fastener bar attached to and extending transverse of the winch bar, and
oo. ears, attached to the pickup bed forward of the bed edge, and being in spaced relation to the pickup bed and extending forward in position to capture the fastener bar when the subframe slides rearward on the pickup bed,
pp. said pickup securing means being in the form of a portion of the cross bar that extends downward adjacent and rearward of the bed edge when the fastener bar is captured by the ears for preventing forward sliding of the subframe on the pickup bed.

* * * * *